(12) United States Patent
Okayama (10) Patent No.: US 8,150,224 B2
(45) Date of Patent: Apr. 3, 2012

(54) SPOT-SIZE CONVERTER

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 148 days.

(21) Appl. No.: 12/695,457

(22) Filed: Jan. 28, 2010

(65) Prior Publication Data

US 2011/0182549 A1  Jul. 28, 2011

(51) Int. Cl.
*G02B 6/26* (2006.01)
(52) U.S. Cl. ............. 385/43; 385/14; 385/27; 385/28; 385/131; 385/132
(58) Field of Classification Search ............ 385/14, 385/27, 28, 30, 49, 43, 129, 130, 131, 132
See application file for complete search history.

(56) References Cited

U.S. PATENT DOCUMENTS

| 6,684,011 | B2 | 1/2004 | Jeong et al. | |
|---|---|---|---|---|
| 7,529,455 | B2* | 5/2009 | Suzuki et al. | 385/129 |
| 2007/0036500 | A1* | 2/2007 | Suzuki et al. | 385/129 |
| 2007/0116419 | A1* | 5/2007 | Blauvelt et al. | 385/129 |
| 2011/0182549 | A1* | 7/2011 | Okayama | 385/43 |

FOREIGN PATENT DOCUMENTS

| JP | 7-63935 A | 3/1995 |
|---|---|---|
| JP | 9-15435 A | 1/1997 |
| JP | 2000-235128 A | 8/2000 |
| JP | 2002-162528 A | 6/2002 |
| JP | 2003-207684 A | 7/2003 |
| JP | 2005-326876 A | 11/2005 |

* cited by examiner

*Primary Examiner* — Brian Healy
(74) *Attorney, Agent, or Firm* — Rabin & Berdo, P.C.

(57) ABSTRACT

A spot-size converter is equipped with a substrate, a clad that is formed on the substrate, a core that is embedded inside the clad, and an input/output end face. The core is tapered toward the input/output end face along a light propagation direction. In the clad, groove portions that expose a substrate face are formed extending as far as the input/output end face and on both sides of the core along the light propagation direction.

6 Claims, 9 Drawing Sheets

SPOT-SIZE CONVERTER

CROSS-REFERENCE TO RELATED APPLICATION

This application is based on Japanese Patent Application No. 2008-314340 filed on Dec. 10, 2008, the entire disclosure of which is incorporated by reference herein.

BACKGROUND OF THE INVENTION

1. Field of the Invention

The present invention relates to a spot-size converter that is used in optical connection between a silicon wire waveguide and an external optical system such as a laser diode or an optical fiber.

2. Description of the Related Art

In recent years, technologies that use silicon as an optical waveguide material have been gathering attention. Among these technologies, there is particularly known an optical waveguide called a silicon wire waveguide that uses silicon as its core and uses silicon dioxide, whose refractive index is extremely smaller than that of silicon, as its clad.

A silicon wire waveguide can strongly trap light in its core because the difference in refractive index between the core and the clad is extremely large. As a result, by using a silicon wire waveguide, manufacture of a compact curved waveguide whose bend radius is made as small as about 1 μm, for example, can be realized, and an optical device with dimensions of an extremely minute submicron order can be created.

For that reason, silicon wire waveguides have been attracting attention as a technology having the potential to be able to incorporate a silicon electronic device and a photonic device on the same chip.

Incidentally, in order to perform connection between a silicon wire waveguide and an external photonic device such as a laser diode (hereinafter also called an LD) or an optical fiber, for example, a spot-size converter is placed between these. This is because the diameter of the core of the silicon wire waveguide is extremely small as compared to common external photonic devices such as an LD or an optical fiber. For that reason, it is necessary to reduce the spot size of light that is inputted to the silicon wire waveguide from the LD or to magnify the spot size of light that is outputted to the optical fiber from the silicon wire waveguide by using a spot-size converter.

As such a spot-size converter, various proposals have conventionally been made. For example, spot-size converters where the width of the optical waveguide is made smaller—that is, is made narrower—in a tapered manner toward an input/output end face are well known (e.g., see Japanese Patent Application Laid-Open (JP-A) No. 2002-162528, JP-A No. 2000-235128, U.S. Pat. No. 6,684,011, and JP-A No. 2003-2076834). Further, spot-size converters where the thickness of the optical waveguide is made smaller—that is, is made thinner—in a tapered manner toward an input/output end face are well known (e.g., see JP-A No. 9-15435 or JP-A No. 2005-326876).

Here, in these spot-size converters, when the input/output end face of the spot-size converter and the end portion of the core on this input/output end face side are spaced apart from each other, there is the fear that the light will spread between the input/output end face and the end portion of the core and that the light will leak out to the substrate on which the core and the clad are formed. As a result, coupling efficiency can worsen when the light is inputted from the LD to the silicon wire waveguide, for example. In order to eliminate this problem, conventionally, a structure that enhances the light trapping effect by including the optical waveguide in a second core—that is, a double core structure—is well known (e.g., see JP-A No. 7-63935).

However, it is difficult to manufacture a spot-size converter with such a double core structure, and the costs of manufacturing a spot-size converter with such a double core structure increase.

SUMMARY OF THE INVENTION

The present invention provides a spot-size converter this is easy to manufacture, is low-cost and has an excellent light trapping effect.

As a result of extensive research, the inventor pertaining to this application found that light can be efficiently trapped by disposing, on both sides of the core, groove portions formed by partially removing the clad.

One aspect of the present invention is a spot-size converter equipped with a clad that is formed on a substrate and a core that is embedded inside this clad. Further, the spot-size converter of the present aspect has an input/output end face. The core is tapered toward the input/output end face along a light propagation direction. In the clad, groove portions that expose a substrate face are formed extending as far as the input/output end face and on both sides of the core along the light propagation direction.

As a result of being equipped with these technical characteristics, in the spot-size converter of the present aspect, an excellent light trapping effect can be obtained by just disposing the groove portions that expose the substrate face in the clad and without forming a double core structure in contrast to the spot-size converters according to the conventional technologies discussed above. Consequently, in the present invention, there can be provided a spot-size converter that is easy to manufacture, is low-cost and can efficiently trap light as compared to the conventional technologies.

BRIEF DESCRIPTION OF THE DRAWINGS

An exemplary embodiment of the present invention will be described in detail based on the following figures, wherein.

DETAILED DESCRIPTION OF THE INVENTION

A spot-size converter pertaining to an exemplary embodiment will be described below with reference to the drawings. The drawings serve only to generally show the shapes, sizes and placement relationships of components to the extent that the exemplary embodiment can be understood. Consequently, the configuration of the present invention is in no way limited only to the configurable examples shown in the drawings.

First Embodiment

In a first embodiment, a spot-size converter equipped with a clad that is formed on a substrate and a core that is embedded inside this clad will be described.

Figure 1A:
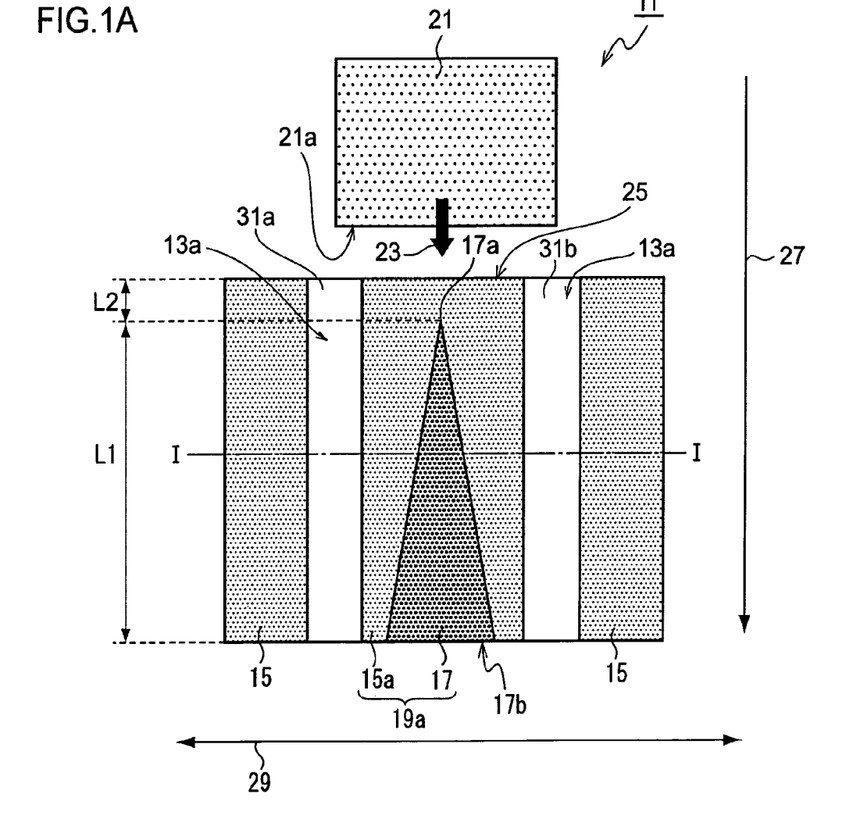
FIG. 1A is a plan diagram generally showing relevant portions of a spot-size converter according to a first embodiment.
Figure 1B:
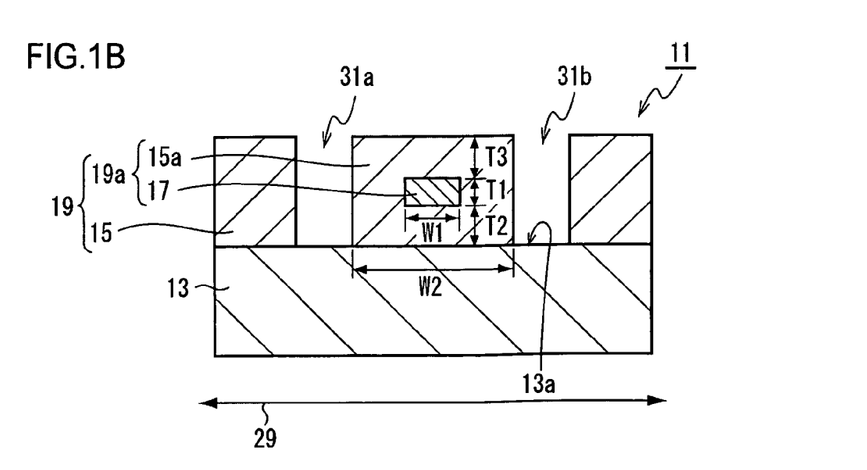
FIG. 1B is a cross-sectional diagram where the structure shown in FIG. 1A is cut along line I-I.

FIG. 1A is a plan diagram generally showing relevant portions of the spot-size converter according to the first embodiment of the invention. FIG. 1B is a diagram showing a cross section where the structure shown in FIG. 1A is cut in a thickness direction of the substrate along line I-I in FIG. 1A—that is, along a direction orthogonal to a light propagation direction.

In an actual spot-size converter, the entire core is formed embedded inside the clad in the structure shown in FIG. 1A. However, in FIG. 1A, part of the clad is omitted to clearly show the characteristic portions pertaining to the first embodiment.

The spot-size converter according to the first embodiment is disposed between an external photonic device such as an LD or an optical fiber, for example, and a silicon wire waveguide. Between the external photonic device and the silicon wire waveguide, spot size conversion of input light that is inputted to the silicon wire waveguide from the external photonic device or output light that is outputted to the external photonic device from the silicon wire waveguide is performed. For this reason, the region of the spot-size converter where at least the input light or the output light propagates is formed as a region that is transparent with respect to the input light and the output light.

A spot-size converter 11 according to first embodiment is equipped with an optical waveguide component 19 that is formed on a substrate 13 and includes a clad 15 and a core 17.

In the spot-size converter 11 according to the first embodiment, input light that is inputted to a silicon wire waveguide from an external photonic device or output light that is outputted to the external photonic device from the silicon wire waveguide is inputted to or outputted from an input/output end face 25 and consequently an input/output port.

In this first embodiment, as shown in FIG. 1A and FIG. 1B, a configurable example where input light 23 that is emitted from an LD 21 serving as an external photonic device is spot-size-converted by the spot-size converter 11 so as to correspond to the spot size of an unillustrated silicon wire waveguide will be described. The silicon wire waveguide is placed on the side opposite the LD 21 across the spot-size converter 11, for example, and is disposed continuously and integrally with the optical waveguide component 19 discussed above (not shown).

The spot-size converter 11 is placed such that the input/output end face 25 directly faces and is preferably spaced 1 to 2 μm, for example, apart from an emission end face 21a of the LD 21 that emits emission light—that is, the input light 23 to the spot-size converter 11.

The substrate 13 is preferably a rectangular parallel plate, for example. The material configuring the substrate 13 is preferably single crystal silicon, for example.

The clad 15 is placed across an entire upper side surface 13a—that is, a substrate face 13a—of the substrate 13. The material configuring the clad 15 is preferably silicon dioxide, for example.

The core 17 is disposed embedded inside the clad 15 and is formed extending linearly.

The refractive index of the core 17 is higher than the refractive index of the clad 15. More specifically, in the embodiment, it is preferable to set the refractive index of the core 17 to about 3.5, for example, and to set the refractive index of the clad 15 to about 1.5 to 1.7, for example. Because of this difference in refractive index, the input light 23 that has been inputted to the optical waveguide component 19 from the input/output end face 25 becomes trapped in the core 17 and, as a result, propagates inside the core 17 along the extension direction of the core 17. Consequently, in the spot-size converter 11 according to the embodiment, the extension direction of the core 17 becomes a light propagation direction 27 indicated by an arrow.

In the spot-size converter 11, a thickness T1 of the core 17 is preferably 0.3 μm, for example. Further, a thickness T2 of the clad 15 on the lower side of the core 17—that is, between the core 17 and the substrate 13—is preferably 2 μm, for example, and a thickness T3 of the clad 15 on the upper side of the core 17 is preferably 2 μm, for example.

The core 17 is tapered along its extension direction—that is, along the light propagation direction 27—toward the input/output end face 25. By forming the core 17 in this shape—that is, a tapered shape—the input light 23 from the LD 21 is spot-size-converted while propagating through the core 17.

When the core 17 is given a tapered shape for the purpose of spot-size-converting the input light 23, the core 17 may employ either a shape where the thickness T1 of the core 17 gradually becomes smaller toward the input/output end face 25 or a shape where the width of the core 17 orthogonal to the light propagation direction 27 and along the substrate face 13a—that is, a width W1 along a widthwise direction 29—gradually becomes smaller toward the input/output end face 25.

When the core 17 is given a shape where the thickness T1 gradually becomes smaller toward the input/output end face 25, the thickness T1 becomes 0 at the distal end of the core 17 on the input/output end face 25 side. In this case, the preferred value of the thickness T1 of the core 17 discussed above is the maximum value of the thickness T1, which is the thickness of the end portion on the opposite side faces the input/output end face 25—that is, an interface 17b with the unillustrated silicon wire waveguide.

When the core 17 is given a shape where the width W1 gradually becomes smaller toward the input/output end face 25, the width W1 becomes 0 at the distal end of the core 17 on the input/output end face side 25. The configurable example shown in FIG. 1A represents a case where the core 17 employs a shape where the width W1 along the widthwise direction of the core 17 gradually becomes narrower toward the input/output end face 25.

It is preferred that a distal end portion 17a of the core 17 on the input/output end face 25 side coincides with the face position of the input/output end face 25 to efficiently input the input light 23 from the LD 21 to the core 17. However, depending upon the spot size of the LD 21, the ease of manufacture or other considerations such as design, the distal end portion 17a and the input/output end face 15 may also be spaced slightly apart from each other. The "spot size of the LD 21" means the half width along the widthwise direction 29 of the peak of the light intensity of the input light that is emitted from this LD 21. Further, FIG. 1A shows an example where the distal end portion 17a and the input/output end face 25 are spaced apart from each other.

In the spot-size converter 11 according to the first embodiment, groove portions 31a and 31b are formed in the clad 15.

The groove portions 31a and 31b are disposed on both sides of the core 17 so as to sandwich the core 17 along the light propagation direction 27 and are formed extending as far as the input/output end face 25. Additionally, the groove portions 31a and 31b expose the substrate face 13a from the bottom faces of the insides of the groove portions 31a and 31b.

The refractive index of these groove portions 31a and 31b is the same as that of the atmosphere—that is, about 1—so it is lower as compared to that of the clad 15. By forming the groove portions 31a and 31b, in the spot-size converter 11 according to the first embodiment, the input light 23 that has been inputted can be strongly trapped from both sides along the widthwise direction 29 in the portion of the optical waveguide component 19 sandwiched between the groove portions 31a and 31b—that is, in the core 17 and in a peripheral clad portion 15a including the core 17. As a result, by inputting the input light 23 to the portion of the optical waveguide component 19 including the core 17 and the peripheral clad portion 15a—that is, an effective optical waveguide component 19a—in the spot-size converter 11 according to this embodiment, the light does not leak to the substrate 13 and spot size conversion can be performed with excellent coupling efficiency.

The spot-size converter 11 according to the first embodiment may also be given a configuration where the groove portions 31a and 31b are embedded using a material whose refractive index is lower than that of the clad 15.

It has been shown by simulations that a preferred value corresponding to the spot size of the LD 21 exists for the width between the groove portions 31a and 31b—that is, a width W2 along the widthwise direction 29 of the effective optical waveguide component 19a. That is, in the spot-size converter 11 according to the first embodiment, it is preferable for the width along the widthwise direction 29 between the groove portions 31a and 31b—that is, the width W2 of the effective optical waveguide component 19a—to be equal to or less than 70% of the spot size of the LD 21 at a maximum. The details of these simulations will be described below.

In this manner, in the spot-size converter 11 according to the first embodiment, an excellent light trapping effect can be obtained by just disposing the groove portions 31a and 31b in the clad 15 and without forming a double core structure in contrast to the spot-size converters according to the conventional technologies. Consequently, in the first embodiment, there can be provided a spot-size converter that is easy to manufacture, is low-cost and can efficiently trap light as compared to the conventional technologies.

Further, the spot-size converter 11 according to this first embodiment can be easily manufactured by preparing a well-known SOI substrate, for example.

That is, first, an SOI substrate configured as a result of a single crystal silicon film, a silicon dioxide film and a silicon film being superposed in this order is prepared. Then, a well-known etching technique is used to partially remove the silicon film, whereby the core 17 discussed above is formed from the remaining portion of this silicon film. Thereafter, the core 17 is embedded in, and a silicon dioxide film is deposited on, the entire face of the SOI substrate. Thus, the optical waveguide component 19 discussed above including the clad 15 configured by silicon dioxide and the core 17 formed embedded inside this clad 15 is formed on the single crystal silicon substrate 13. Moreover, the regions of the clad 15 on both sides of the core 17 along the light propagation direction 27 are removed until the substrate face 13a is exposed using a well-known etching technique across the input/output end face 25 from these regions on both sides of the core 17, whereby these removed regions become the groove portions 31a and 31b discussed above.

The inventor pertaining to the present invention performed simulations using the beam propagation method (BPM) to evaluate the properties of the spot-size converter according to this first embodiment and to verify optimum values of its various dimensions.

FIG. 2 to FIG. 8B show results of the simulations resulting from the BPM. Each of these results will be described below.

Each of the simulations by which each of the results shown in FIG. 2 to FIG. 8B was obtained was, unless otherwise noted, performed with each of the following conditions being set in regard to the spot-size converter 11 of the first embodiment according to the configurable example shown in FIG. 1A and FIG. 1B.

In each of the simulations, the thickness T2 of the clad 15 on the lower side of the core 17 was set to 2 μm, and the thickness T3 of the clad 15 on the upper side of the core 17 was set to 2 μm.

Each of the simulations was performed assuming a case where the spot-size converter 11 of the first embodiment was connected to and used with a silicon wire waveguide having a core whose thickness was 0.3 μm and whose width orthogonal to the thickness direction and the light propagation direction was 0.3 μm. For that reason, the thickness T1 of the core 17 of the spot-size converter 11 was set to 0.3 μm. Additionally, the maximum value of the width W1 along the widthwise direction of the core 17 having a tapered shape—that is, the width W1 at the interface 17b with the unillustrated silicon wire waveguide—was set to 0.3 μm.

Each of the simulations shows coupling efficiency in a case where the spot size of the LD 21 was 3 μm and the input light 23 with a wavelength of 1.31 μm that is emitted from this LD 21 was inputted to the effective optical waveguide component 19a from the input/output end face 25.

The vertical axis in each of the diagrams represents the coupling efficiency of the spot-size converter 11 with the relative value of the light intensity. That is, assuming that 1 represents the light intensity of the input light 23 that is emitted from the LD 21, the vertical axis in each of the diagrams represents the relative value of the light intensity of this input light 23 when it has been spot-size-converted by the spot-size converter 11. There are some diagrams that show a result where this relative light intensity value exceeds 1. This is thought to be error resulting from the shape of the input light 23 changing as a result of the input light 23 being spot-size-converted.

Figure 2:
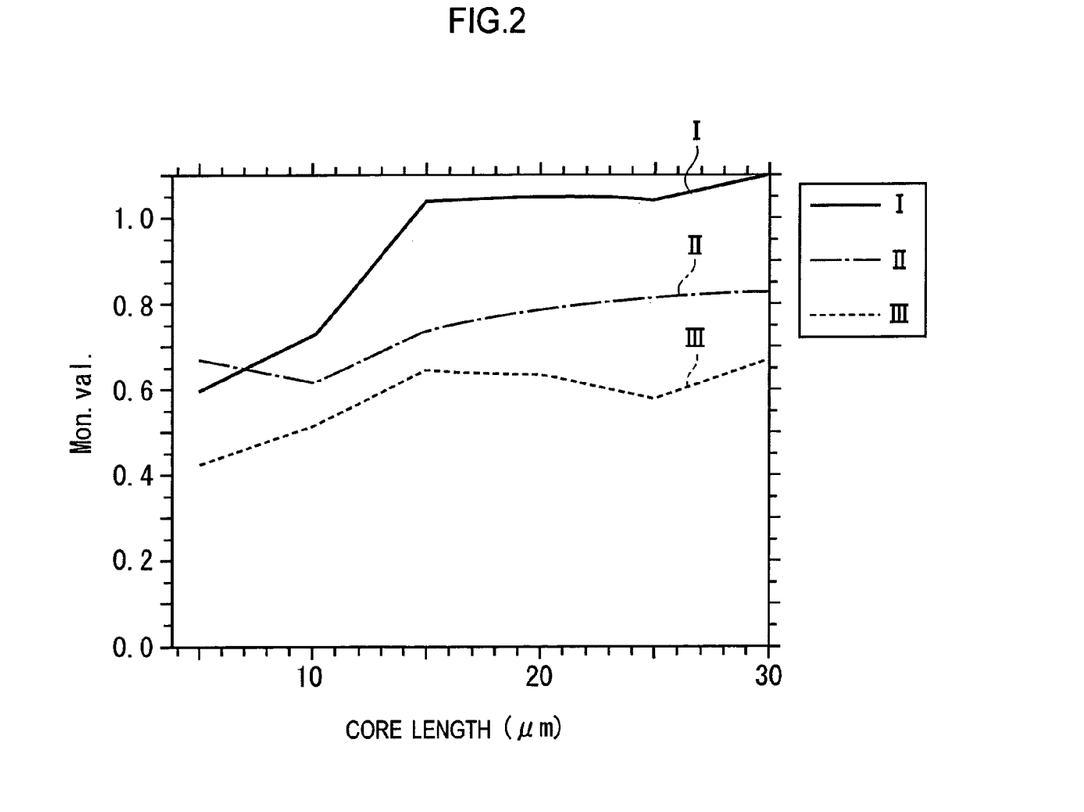
FIG. 2 is a diagram showing the relationship between a taper length L1 and coupling efficiency in the spot-size converter according to the first embodiment.

FIG. 2 is a diagram showing the relationship between a length L1 of the core 17 along the light propagation direction 27—that is, a taper length L1 of the tapered shape—and coupling efficiency in the spot-size converter 11. In FIG. 2, the horizontal axis scales the length L1 of the core 17 in μm units. In the simulation by which the results of FIG. 2 where obtained, the width between the groove portions 31a and 31b—that is, the width W2 along the widthwise direction 29 of the effective optical waveguide component 19a—was set to 2 μm.

Curve I in FIG. 2 represents a result when a spaced-apart distance L2 between the distal end portion 17a and the input/output end face 25 was 0 μm—that is, when the distal end portion 17a coincided with the face position of the input/output end face 25. Curve II in FIG. 2 represents a result when the spaced-apart distance L2 between the distal end portion 17a and the input/output end face 25 was 10 μm. Curve III in FIG. 2 represents a result when the spaced-apart distance L2 between the distal end portion 17a and the input/output end face 25 was 20 μm.

From the results of FIG. 2, it is apparent that, in the spot-size converter 11, as long as the taper length L1 is equal to or greater than 20 μm, the coupling efficiency that is obtained does not vary greatly in each of the spaced-apart distances L2. Consequently, from these results, in the spot-size converter 11 according to the first embodiment, it is preferable to set the taper length L1 to at least 20 μm.

Figure 3:
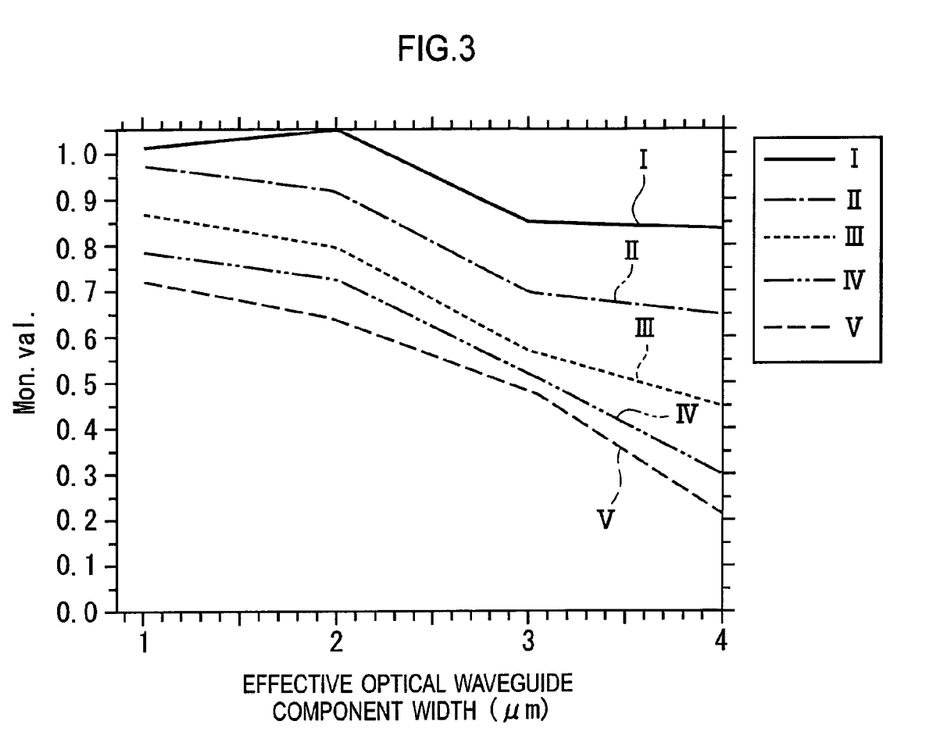
FIG. 3 is a diagram showing the relationship between a width W2 of an effective optical waveguide component and coupling efficiency in the spot-size converter according to the first embodiment.

Next, FIG. 3 is a diagram showing the relationship between the width W2 along the widthwise direction 29 of the effective optical waveguide component 19a and coupling efficiency in the spot-size converter 11. In FIG. 3, the horizontal axis scales the width W2 of the effective optical waveguide component 19a in μm units. In the simulations by which the results of FIG. 3 were obtained, the taper length L1 was 30 μm.

Curve I in FIG. 3 represents a result when the spaced-apart distance L2 between the distal end portion 17a and the input/output end face 25 was 0 μm—that is, when the distal end portion 17a coincided with the face position of the input/output end face 25. Curve II in FIG. 3 represents a result when the spaced-apart distance L2 between the distal end portion 17a and the input/output end face 25 was 5 μm. Curve III in FIG. 3 represents a result when the spaced-apart distance L2 between the distal end portion 17a and the input/output end face 25 was 10 μm. Curve IV in FIG. 3 represents a result when the spaced-apart distance L2 between the distal end portion 17a and the input/output end face 25 was 15 μm. Curve V in FIG. 3 represents a result when the spaced-apart distance L2 between the distal end portion 17a and the input/output end face 25 was 20 μm.

From the results of FIG. 3, it is understood that, in the spot-size converter 11, when the width W2 of the effective optical waveguide component 19a becomes greater than 2 μm in each of the spaced-apart distances L2 when the spot size of the LD 21 is 3 μm, the coupling efficiency that is obtained remarkably drops. Consequently, from these results, in the spot-size converter 11 according to the first embodiment, it is preferable to set the width W2 of the effective optical waveguide component 19a equal to or less than 2 μm at a maximum when the spot size of the LD 21 is 3 μm, for example.

Figure 4A:
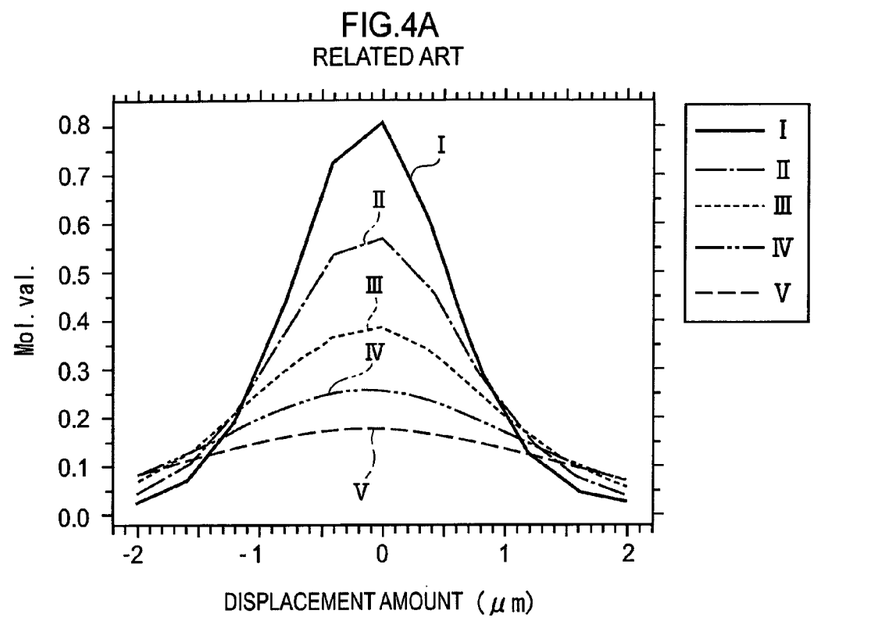
FIG. 4A and FIG. 4B are diagrams for evaluating the effect of groove portions of the spot-size converter according to the first embodiment.
Figure 4B:
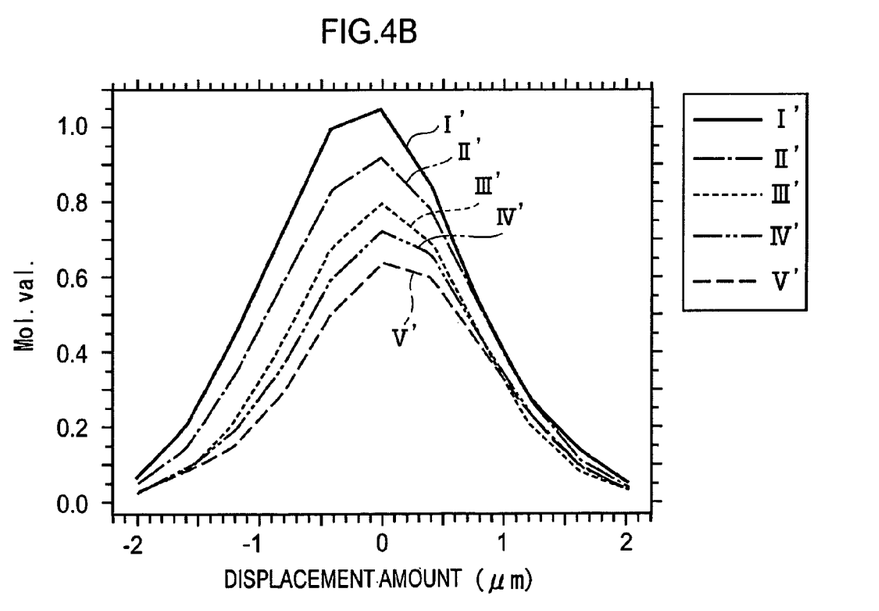

Next, FIG. 4A and FIG. 4B are diagrams for evaluating the effect of the groove portions 31a and 31b of the spot-size converter 11 according to the first embodiment.

FIG. 4A is a diagram showing the relationship between displacement amounts when the LD is displaced on both sides along the widthwise direction and coupling efficiency in a spot-size converter according to the conventional technologies—that is, a spot-size converter in which groove portions are not formed.

Further, FIG. 4B is a diagram showing the relationship between displacement amounts when the LD 21 is displaced on both sides along the widthwise direction 29 and coupling efficiency in the spot-size converter 11 according to the first embodiment. In the simulations by which the results of FIG. 4B were obtained, the width between the groove portions 31a and 31b—that is, the width W2 of the effective optical waveguide component 19a—was 2 μm. In the simulations by which the results of FIG. 4B were obtained, there was assumed the spot-size converter 11 of a configurable example where, in contrast to the configuration shown in FIG. 1A and FIG. 1B, one side face of the core 17 extending from the distal end portion 17a and orthogonal to the substrate face 13a was made parallel along the light propagation direction 27 and the other side face was made into a slanted face with respect to this one side face to give the core 17 a tapered shape.

In the simulations by which the results of FIG. 4A and FIG. 4B were obtained, the only difference in terms of configuration between the spot-size converter 11 according to the first embodiment assumed as a sample and the spot-size converter according to the conventional technologies was whether or not they had groove portions. In the simulations by which the results of FIG. 4A and FIG. 4B were obtained, the length of the core along the light propagation direction—that is, the taper length—was 20 μm.

In FIG. 4A and FIG. 4B, assuming that 0 represents a point where the central axis along the light propagation direction of the spot of the LD coincides with the widthwise direction center along the light propagation direction of the core of the spot-size converter, the horizontal axis scales the displacement amount of the LD along the widthwise direction from this point in μm units. This horizontal axis shows displacement values when the LD is displaced to one side along the widthwise direction from the 0 point discussed above as being positive values and shows displacement values when the LD is displaced to the other side as being negative values.

Curve I in FIG. 4A represents a result when, in the spot-size converter according to the conventional technologies, the spaced-apart distance between the distal end portion on the input/output end face side of the core and the input/output end face was 0 μm—that is, when the distal end portion coincided with the face position of the input/output end face. Curve II in FIG. 4A represents a result when the spaced-apart distance between the distal end portion of the core and the input/output end face was 5 μm. Curve III in FIG. 4A represents a result when the spaced-apart distance between the distal end portion of the core and the input/output end face was 10 μm. Curve IV in FIG. 4A represents a result when the spaced-apart distance between the distal end portion of the core and the input/output end face was 15 μm. Curve V in FIG. 4A represents a result when the spaced-apart distance between the distal end portion of the core and the input/output end face was 20 μm.

Curve I' in FIG. 4B represents a result when, in the spot-size converter 11 according to the first embodiment, the spaced-apart distance L2 between the distal end portion 17a and the input/output end face 25 was 0 μm—that is, when the distal end portion 17a coincided with the face position of the input/output end face 25. Curve II' in FIG. 4B represents a result when the spaced-apart distance L2 between the distal end portion 17a and the input/output end face 25 was 5 μm. Curve III' in FIG. 4B represents a result when the spaced-apart distance L2 between the distal end portion 17a and the input/output end face 25 was 10 μm. Curve IV' in FIG. 4B represents a result when the spaced-apart distance L2 between the distal end portion 17a and the input/output end face 25 was 15 μm. Curve V' in FIG. 4B represents a result when the spaced-apart distance L2 between the distal end portion 17a and the input/output end face 25 was 20 μm.

As is apparent from the result of FIG. 4A and FIG. 4B, in the spaced-apart distances between the distal end portion of the core and the input/output end face, the spot-size converter 11 according to the first embodiment exhibits excellent coupling efficiency as compared to the spot-size converter according to the conventional technologies. Consequently, from these results, it was verified that, by disposing the guide portions 31a and 31b, the input light 23 is efficiently trapped inside the effective optical waveguide component 19a.

From the results of FIG. 4A and FIG. 4B, it is understood that, in the spot-size converter 11 according to the first embodiment and in the spot-size converter according to the conventional technologies, affects on coupling efficiency resulting from positional displacement along the widthwise direction between the LD and the spot-size converter are about the same. However, as discussed above, in the spot-size converter 11 according to the first embodiment, coupling efficiency improves as compared to the spot-size converter according to the conventional technologies in the spaced-apart distances between the distal end portion of the core and the input/output end face. For that reason, even when the LD is displaced along the widthwise direction, excellent coupling efficiency can be obtained.

Figure 5:
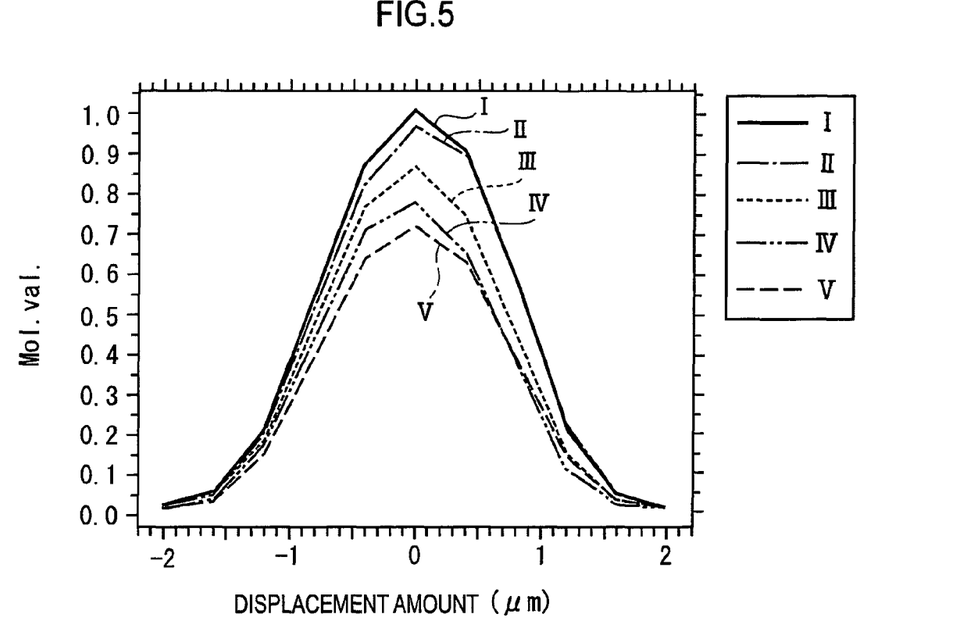
FIG. 5 is a diagram for evaluating the effect of the groove portions of the spot-size converter according to the first embodiment.

FIG. 5 is, like FIG. 4B, a diagram showing the relationship between displacement amounts when the LD 21 is displaced on both sides along the widthwise direction 29 and coupling efficiency in the spot-size converter 11 according to the first embodiment. In the simulations by which the results of FIG. 5 were obtained, the width between the groove portions 31a and 31b—that is, the width W2 of the effective optical waveguide component 19a—was 1 μm. Further, in the simulations by which the results of FIG. 5 were obtained, the taper length L1 was 20 μm.

In FIG. 5, assuming that 0 represents a point where the central axis along the light propagation direction of the spot of the LD coincides with the widthwise direction center along the light propagation direction of the core of the spot-size converter, the horizontal axis scales the displacement amount of the LD 21 along the widthwise direction from this point in μm units. This horizontal axis shows displacement values when the LD 21 is displaced to one side along the widthwise direction from the 0 point discussed above as being positive values and shows displacement values when the LD 21 is displaced to the other side as being negative values.

Curve I in FIG. 5 represents a result when, in the spot-size converter 11 according to the first embodiment, the spaced-apart distance L2 between the distal end portion 17a and the input/output end face 25 was 0 μm—that is, when the distal end portion 17a coincided with the face position of the input/output end face 25. Curve II in FIG. 5 represents a result when the spaced-apart distance L2 between the distal end portion 17a and the input/output end face 25 was 5 μm. Curve III in FIG. 5 represents a result when the spaced-apart distance L2 between the distal end portion 17a and the input/output end face 25 was 10 μm. Curve IV in FIG. 5 represents a result when the spaced-apart distance L2 between the distal end portion 17a and the input/output end face 25 was 15 μm. Curve V in FIG. 5 represents a result when the spaced-apart distance L2 between the distal end portion 17a and the input/output end face 25 was 20 μm.

When the results of FIG. 5 are compared with the results of FIG. 4B that have already been described, it is understood that, by shortening the width W2 of the effective optical waveguide component 19a to 1 μm in the spot-size converter 11 according to the first embodiment, the coupling effect that is obtained improves in each of the spaced-apart distances L2.

In the simulations by which the results of FIG. 5 were obtained, by shortening the width W2 of the effective optical waveguide component 19a of the spot-size converter 11, the substantial width along the widthwise direction 29 of the input/output end face 25 on which the input light 23 is made incident becomes shorter. As a result, displacement along the widthwise direction 29 of the LD 21 is greatly affected as compared to the simulations by which the results of FIG. 4B were obtained—that is, when the width W2 of the effective optical waveguide component 19a was 2 μm. However, as is apparent from the results of FIG. 5, as long as the displacement amount of the LD 21 is within the range of −0.5 to 0.5 μm, the spot-size converter 11 where the width W2 has been set to 1 μm is virtually not affected by this displacement and exhibits excellent coupling efficiency. Keeping and positioning the LD 21 whose spot size is 3 μm in a displacement amount within the range of −0.5 to 0.5 μm with respect to the effective optical waveguide component 19a whose width W2 is 1 μm is easy. For that reason, even in the spot-size converter 11 where the width W2 is 1 μm, it can be said that excellent coupling efficiency can be obtained.

Figure 6A:
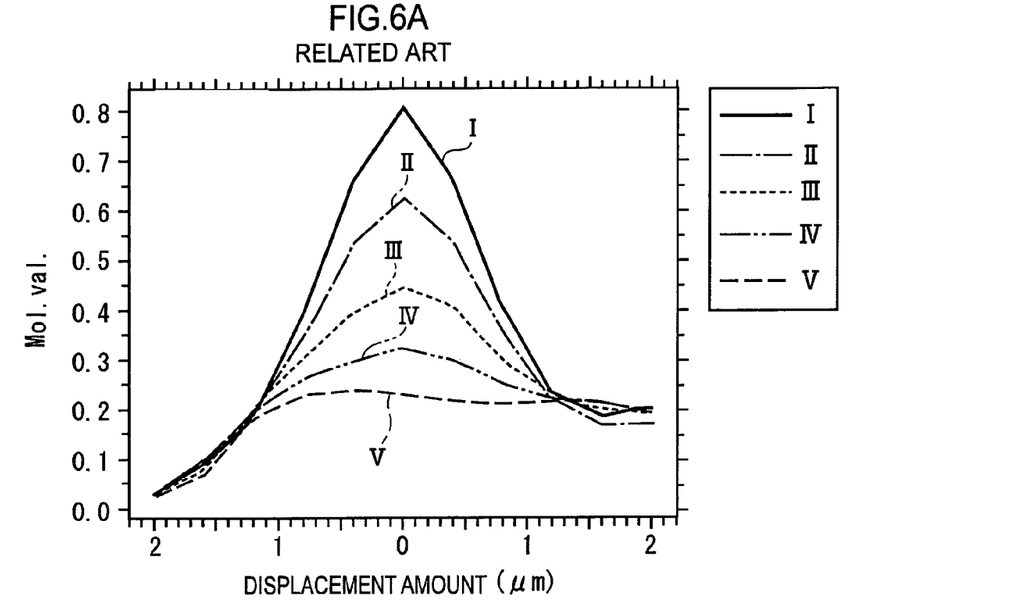
FIG. 6A and FIG. 6B are diagrams for evaluating the effect of the groove portions of the spot-size converter according to the first embodiment.
Figure 6B:
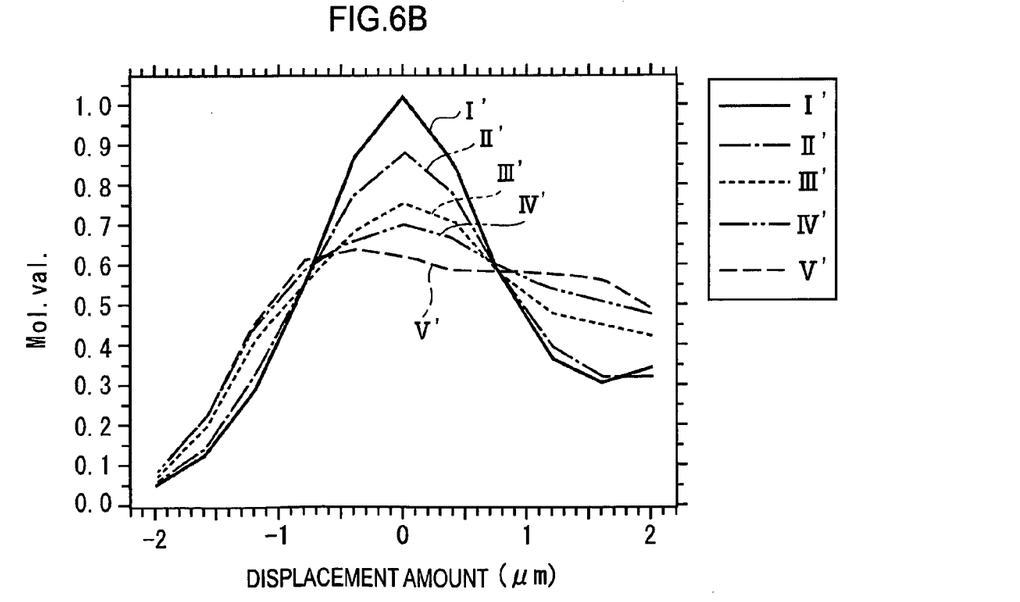

FIG. 6A and FIG. 6B are diagrams for evaluating the effect of the groove portions 31a and 31b of the spot-size converter 11 according to the first embodiment.

FIG. 6A is a diagram showing the relationship between displacement amounts—when the LD is displaced vertically along the thickness direction of the substrate and coupling efficiency in a spot-size converter according to the conventional technologies—that is, a spot-size converter in which groove portions are not formed.

FIG. 6B is a diagram showing the relationship between displacement amounts when the LD 21 is displaced vertically along the thickness direction of the substrate 13 and coupling efficiency in the spot-size converter 11 according to the first embodiment. In the simulations by which the results of FIG. 6B were obtained, the width between the groove portions 31a and 31b—that is, the width W2 of the effective optical waveguide component 19a—was 2 μm.

In the simulations by which the results of FIG. 6A and FIG. 6B were obtained, the only difference in terms of configuration between the spot-size converter 11 according to the first embodiment assumed as a sample and the spot-size converter according to the conventional technologies was whether or not they had groove portions. In the simulations by which the results of FIG. 6A and FIG. 6B were obtained, the length of the core along the light propagation direction—that is, the taper length—was 20 μm. Further, as has already been described, in these simulations, the wavelength of the input light emitted from the LD was 1.31 μm.

In FIG. 6A and FIG. 6B, assuming that 0 represents a point where the central axis along the light propagation direction of the spot of the LD coincides with the thickness direction center along the light propagation direction of the core of the spot-size converter, the horizontal axis scales the displacement amount of the LD along the thickness direction from this point in μm units. This horizontal axis shows displacement values when the LD is displaced to the upper side along the thickness direction from the 0 point discussed above as being positive values and shows displacement values when the LD is displaced to the lower side as being negative values.

Curve I in FIG. 6A represents a result when, in the spot-size converter according to the conventional technologies, the spaced-apart distance between the distal end portion on the input/output end face side of the core and the input/output end face was 0 µm—that is, when the distal end portion coincided with the face position of the input/output end face. Curve II in FIG. 6A represents a result when the spaced-apart distance between the distal end portion of the core and the input/output end face was 5 µm. Curve III in FIG. 6A represents a result when the spaced-apart distance between the distal end portion of the core and the input/output end face was 10 µm. Curve IV in FIG. 6A represents a result when the spaced-apart distance between the distal end portion of the core and the input/output end face was 15 µm. Curve V in FIG. 6A represents a result when the spaced-apart distance between the distal end portion of the core and the input/output end face was 20 µm.

Curve I' in FIG. 6B represents a result when, in the spot-size converter 11 according to the first embodiment, the spaced-apart distance L2 between the distal end portion 17a and the input/output end face 25 was 0 µm—that is, when the distal end portion 17a coincided with the face position of the input/output end face 25. Curve II' in FIG. 6B represents a result when the spaced-apart distance L2 between the distal end portion 17a and the input/output end face 25 was 5 µm. Curve III' in FIG. 6B represents a result when the spaced-apart distance L2 between the distal end portion 17a and the input/output end face 25 was 10 µm. Curve IV' in FIG. 6B represents a result when the spaced-apart distance L2 between the distal end portion 17a and the input/output end face 25 was 15 µm. Curve V' in FIG. 6B represents a result when the spaced-apart distance L2 between the distal end portion 17a and the input/output end face 25 was 20 µm.

As is apparent from the results of FIG. 6A and FIG. 6B, in the spaced-apart distances between the distal end portion of the core and the input/output end face, the spot-size converter 11 according to the first embodiment exhibits excellent coupling efficiency as compared to the spot-size converter according to the conventional technologies. Consequently, from these results, it was verified that, by disposing the guide portions 31a and 31b, the input light 23 is efficiently trapped inside the effective optical waveguide component 19a.

From the results of FIG. 6A and FIG. 6B, it is understood that, in the spot-size converter 11 according to the first embodiment and in the spot-size converter according to the conventional technologies, affects on coupling efficiency resulting from positional displacement along the thickness direction between the LD and the spot-size converter are about the same. However, as discussed above, in the spot-size converter 11 according to the first embodiment, coupling efficiency improves as compared to the spot-size converter according to the conventional technologies in the spaced-apart distances between the distal end portion of the core and the input/output end face. Therefore, even when the LD is displaced along the thickness direction, excellent coupling efficiency can be obtained.

Figure 7A:
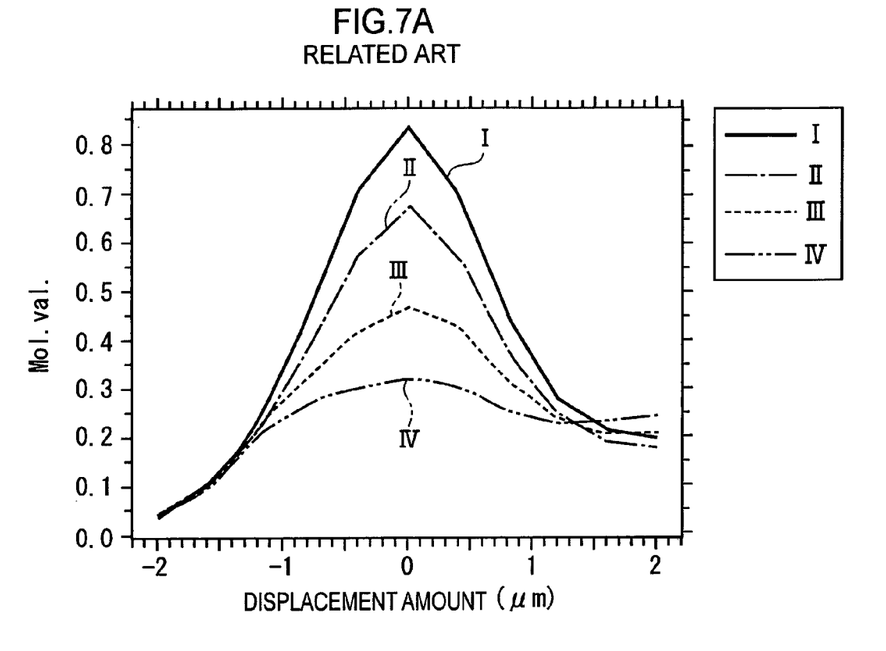
FIG. 7A and FIG. 7B are diagrams for evaluating the effect of the groove portions of the spot-size converter according to the first embodiment.
Figure 7B:
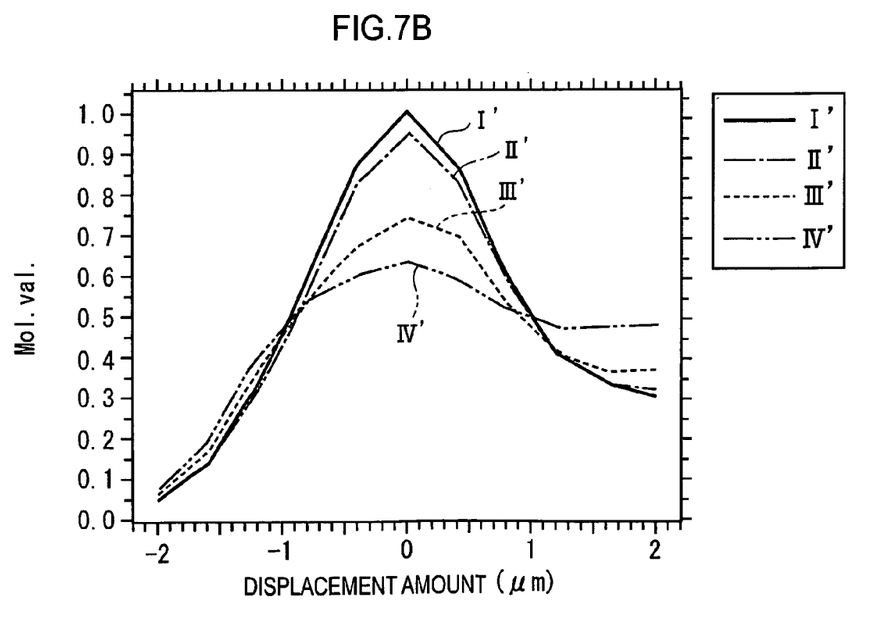

FIG. 7A and FIG. 7B are diagrams for evaluating the effect of the groove portions 31a and 31b of the spot-size converter 11 according to the first embodiment.

FIG. 7A and FIG. 7B were obtained by performing the same simulations as the simulations by which FIG. 6A and FIG. 6B discussed above were obtained except that the wavelength of the input light from the LD and the length along the light propagation direction of the core—that is, the taper length—were changed. That is, in these simulations, the wavelength of the input light from the LD was changed to 1.49 µm. In these simulations, the taper length of the core was changed to 10 µm in the spot-size converter according to the conventional technologies and in the spot-size converter 11 according to the first embodiment. The other configurations are the same as that in the spot-size converter of the conventional technologies and the spot-size converter 11 of the first embodiment, which are respectively used as samples for the simulations result in FIGS. 6A and 6B.

In FIG. 7A and FIG. 7B, the horizontal axis scales the displacement amount of the LD along the thickness direction of the LD in µm units like in FIG. 6A and FIG. 6B.

Curve I in FIG. 7A represents a result when, in the spot-size converter according to the conventional technologies, the spaced-apart distance between the distal end portion on the input/output end face side of the core and the input/output end face was 0 µm—that is, when the distal end portion coincided with the face position of the input/output end face. Curve II in FIG. 7A represents a result when the spaced-apart distance between the distal end portion of the core and the input/output end face was 5 µm. Curve III in FIG. 7A represents a result when the spaced-apart distance between the distal end portion of the core and the input/output end face was 10 µm. Curve IV in FIG. 7A represents a result when the spaced-apart distance between the distal end portion of the core and the input/output end face was 15 µm.

Curve I' in FIG. 7B represents a result when, in the spot-size converter 11 according to the first embodiment, the spaced-apart distance L2 between the distal end portion 17a and the input/output end face 25 was 0 µm—that is, when the distal end portion 17a coincided with the face position of the input/output end face 25. Curve II' in FIG. 7B represents a result when the spaced-apart distance L2 between the distal end portion 17a and the input/output end face 25 was 5 µm. Curve III' in FIG. 7B represents a result when the spaced-apart distance L2 between the distal end portion 17a and the input/output end face 25 was 10 µm. Curve IV' in FIG. 7B represents a result when the spaced-apart distance L2 between the distal end portion 17a and the input/output end face 25 was 15 µm.

As is apparent from FIG. 7A and FIG. 7B, even when the wavelength of the input light is 1.49 µm, in the spaced-apart distances between the distal end portion of the core and the input/output end face, the spot-size converter 11 according to the first embodiment exhibits excellent coupling efficiency as compared to the spot-size converter according to the conventional technologies. Consequently, it was verified that, by disposing the guide portions 31a and 31b, the input light 23 is efficiently trapped inside the effective optical waveguide component 19a.

From the results of FIG. 7A and FIG. 7B, it is understood that, in the spot-size converter 11 according to the first embodiment and in the spot-size converter according to the conventional technologies, affects on coupling efficiency resulting from positional displacement along the thickness direction between the LD and the spot-size converter are about the same.

Here, in an optical transmission and reception system that performs optical signal transmission and reception using a single optical fiber, such as an optical subscriber system, for example, in many cases an optical signal with a wavelength of 1.31 µm is used as an uplink signal from a subscriber to a station and an optical signal with a wavelength of 1.49 µm is used as a downlink signal from a station to a subscriber. Additionally, as is apparent from the results of FIG. 6A and FIG. 6B and FIG. 7A and FIG. 7B discussed above, it is understood that, in the spot-size converter 11 according to the first embodiment, excellent coupling efficiency is obtained with respect to both input light with a wavelength of 1.31 µm and input light with a wavelength of 1.49 µm. Consequently, the spot-size converter 11 according to this first embodiment can spot-size-convert, in the optical transmission and reception system discussed above, both the uplink optical signals and the downlink optical signals with excellent coupling efficiency.

Figure 8A:
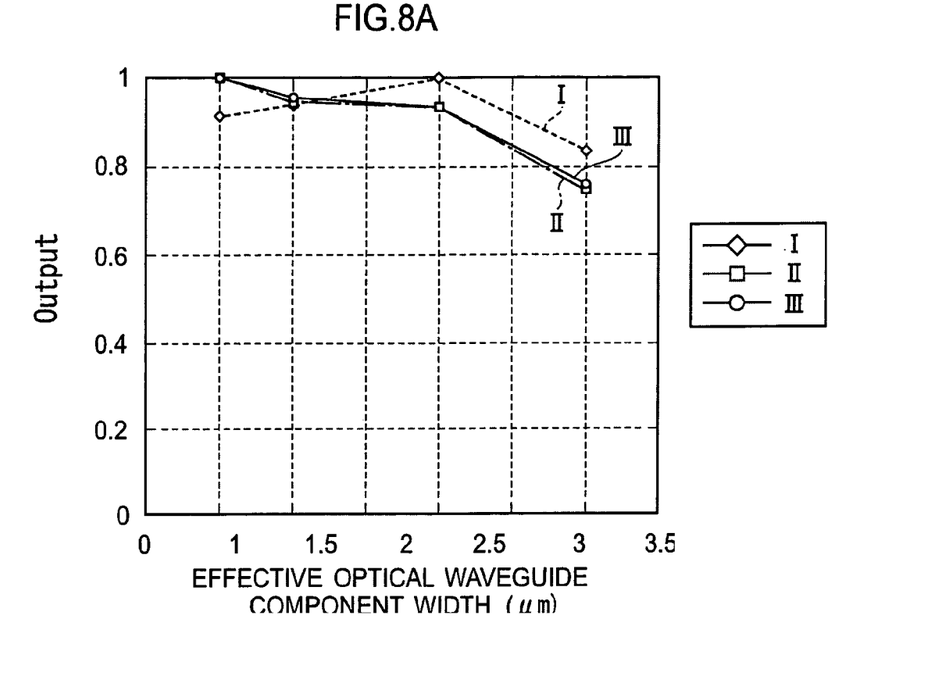
FIG. 8A and FIG. 8B are diagrams showing the relationship between the width W2 of the effective optical waveguide component and coupling efficiency in the spot-size converter according to the first embodiment of the invention.
Figure 8B:
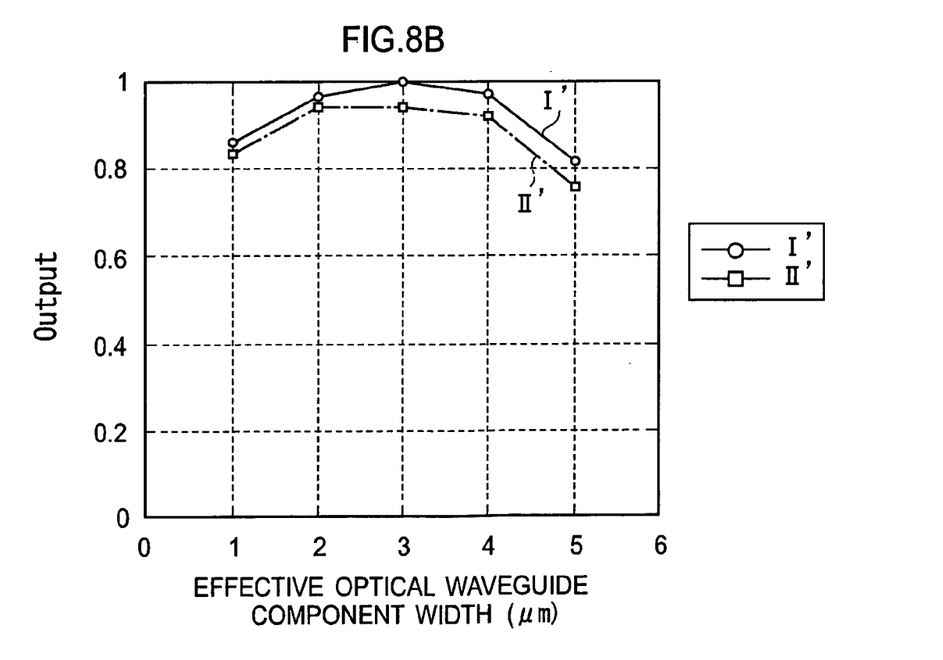

FIG. 8A and FIG. 8B are diagrams showing the relationship between the width W2 along the widthwise direction 29 of the effective optical waveguide component 19a and coupling efficiency in the spot-size converter 11 according to the first embodiment. In FIG. 8A and FIG. 8B, the horizontal axis scales the width W2 of the effective optical waveguide component 19a in μm units.

FIG. 8A shows results when the input light 23 from the LD 21 whose spot size is 3 μm has been inputted to the spot-size converter 11 according to the first embodiment. In the simulations by which these results were obtained, the length L1 along the light propagation direction 27 of the core 17—that is, the taper length L1—was set to 30 μm and the spaced-apart distance L2 between the distal end portion 17a of the core 17 and the input/output end face 25 was set to 5 μm.

FIG. 8B shows results when the input light 23 from the LD 21 whose spot size is 6 μm has been inputted to the spot-size converter 11 according to the first embodiment. In the simulations by which these results were obtained, the length L1 along the light propagation direction 27 of the core 17—that is, the taper length L1—was set to 70 μm and the spaced-apart distance L2 between the distal end portion 17a of the core 17 and the input/output end face 25 was set to 5 μm.

Curve I in FIG. 8A represents a result when the thickness T2 of the clad 15 on the lower side of the core 17 was set to 1 μm and the thickness T3 of the clad 15 on the upper side of the core 17 was set to 1 μm. Curve II in FIG. 8A represents a result when the thickness T2 was set to 2 μm and the thickness T3 was set to 2 μm. Curve III in FIG. 8A represents a result when the thickness T2 was set to 3 μm and the thickness T3 was set to 3 μm.

Curve I' in FIG. 8B represents a result when the thickness T2 of the clad 15 on the lower side of the core 17 was set to 2 μm and the thickness T3 of the clad 15 on the upper side of the core 17 was set to 2 μm. Curve II' in FIG. 8B represents a result when the thickness T2 was set to 3 μm and the thickness T3 was set to 3 μm.

From the results of FIG. 8A, it will be understood that, in the spot-size converter 11, when the spot size of the LD 21 is 3 μm, excellent coupling efficiency is obtained as long as the width W2 of the effective optical waveguide component 19a is within 2 μm in each of the thicknesses T2 and T3 of the clad 15.

From the results of FIG. 8B, it will be understood that, in the spot-size converter 11, when the spot size of the LD 21 is 6 μm, excellent coupling efficiency is obtained as long as the width W2 of the effective optical waveguide component 19a is within 2 to 4 μm in each of the thicknesses T2 and T3 of the clad 15.

Consequently, as is apparent from the results of FIG. 8A and FIG. 8B, it can be said that, in the spot-size converter 11 according to the first embodiment, it is preferred to set the width W2 of the effective optical waveguide component 19a equal to or less than 70% of the spot size of the LD 21 at a maximum in order to obtain excellent coupling efficiency.

<First Modification>

In a first modification, a spot-size converter where the configuration of the groove portions 31a and 31b described in the first embodiment discussed above (see FIG. 1B) is changed from the configurable example discussed above will be described.

In this first modification, in order to more efficiently obtain the light trapping effect discussed above, an additional configuration is disposed in the spot-size converter 11 according to the first embodiment discussed above (see FIG. 1A and FIG. 1B). Other components and the action and effects of the first modification are the same as those of the first embodiment, so in regard to shared components, the same reference numerals will be given thereto and redundant description thereof will be omitted.

Figure 9:
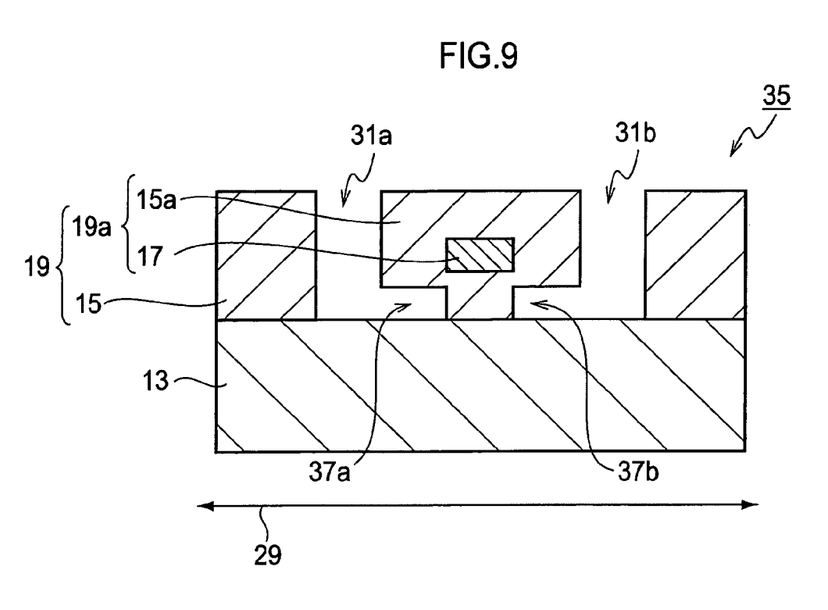
FIG. 9 is a general cross-sectional diagram describing a first modification.

FIG. 9 is a general cross-sectional diagram describing the first modification. The cross section shown in FIG. 9 corresponds to the cross section cut in the thickness direction of the substrate along line I-I shown in FIG. 1A.

In a spot-size converter 35 according to the first modification, the groove portions 31a and 31b are formed in the peripheral clad portion 15a including the core 17.

Transverse grooves 37a and 37b are formed along the substrate face 13a toward the core 17.

In the spot-size converter 35 according to this first modification, in addition to the effect of trapping light from both sides along the widthwise direction 29 resulting from the groove portions 31a and 31b, the effect of trapping light from the lower side along the thickness direction of the substrate 13 between the effective optical waveguide component 19a and the substrate 13 can also be obtained because of the transverse grooves 37a and 37b. Consequently, in the configuration of the spot-size converter 35 according to the first modification, the light trapping effect of the spot-size converter according to the first embodiment discussed above can be obtained more efficiently.

<Second Modification>

In a second modification, a spot-size converter where the configuration of the groove portions 31a and 31b described in the first embodiment or the first modification discussed above (see FIG. 1B and FIG. 9) is changed from these configurable examples discussed above will be described.

In the second modification, in order to more efficiently obtain the light trapping effect discussed above, an additional configuration is disposed in the spot-size converter 11 according to the first embodiment (see FIG. 1A and FIG. 1B) or the spot-size converter 35 according to the first modification discussed above. Other components and the action and effects of the second modification are the same as those of the first embodiment, so in regard to shared components, the same reference numerals will be given thereto and redundant description thereof will be omitted. Here, a configurable example when this second modification is applied to the spot-size converter 11 according to the first embodiment discussed above will be shown and described.

Figure 10:
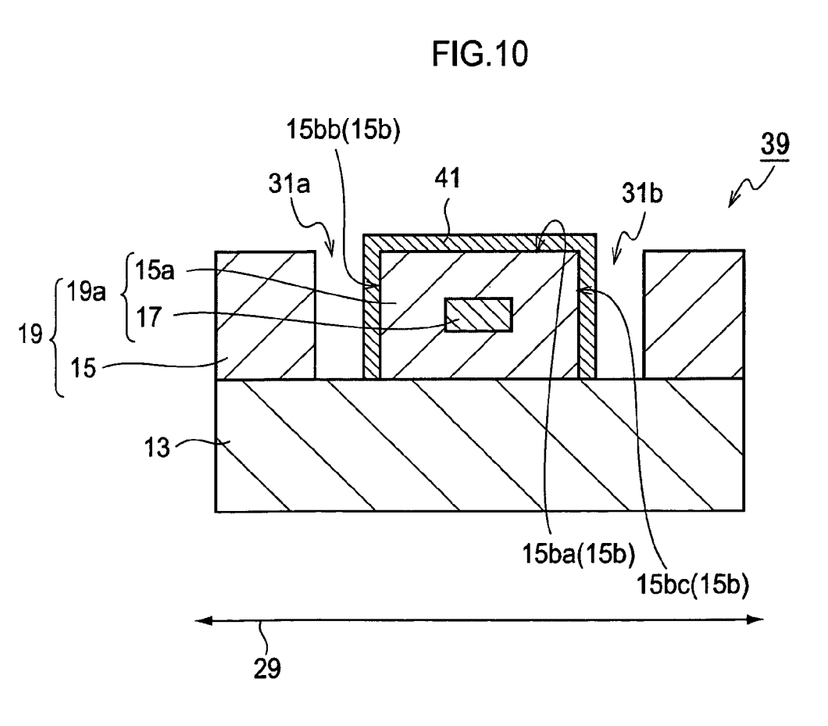
FIG. 10 is a general cross-sectional diagram describing a second modification.

FIG. 10 is a general cross-sectional diagram describing the second modification. The cross section shown in FIG. 10 corresponds to the cross section cut in the thickness direction of the substrate along line I-I shown in FIG. 1A.

In a spot-size converter 39 according to the second modification, an exposed surface 15b of the peripheral clad portion 15a—that is, an exposed surface 15b of the effective optical waveguide component 19a—is covered by a reflective film 41.

The material of the reflective film 41 preferably includes single crystal silicon whose refractive index is about 3.5, for example, and it is good for the reflective film 41 to be disposed in a thickness of about 0.1 μm, for example.

In the spot-size converter 39 according to this second modification, the effective optical waveguide component 19a is covered by the reflective film 41. For that reason, light that has been inputted into the effective optical waveguide component 19a is trapped by this reflective film 41 from both sides along the widthwise direction 29 and from the upper side along the thickness direction of the substrate 13. Consequently, in the configuration of the spot-size converter 39 according to this second modification, the light trapping effect of the spot-size converter according to the first embodiment or the first modification discussed above can be obtained more efficiently.

FIG. 10 shows a configurable example where the reflective film 41 covers the entire exposed surface 15*b* of the peripheral clad portion 15*a*—that is, an upper face 15*ba* that opposes the substrate face 13*a* and both side faces 15*bb* and 15*bc* that are exposed as inside wall faces of the groove portions 31*a* and 31*b* and which are orthogonal to the substrate face 13*a* and are along the light propagation direction 27. However, the spot-size converter 39 according to this second modification may also be given a configuration where, depending upon the ease of manufacture, manufacturing costs and other considerations such as design, the reflective film 41 covers just part of the exposed surface 15*b* of the peripheral clad portion 15*a*, such the upper face 15*ba*, for example. In this case, leakage of light toward the upper face 15*ba* is suppressed by the trapping effect resulting from the reflective film 41, and leakage of light toward both sides along the widthwise direction 29 is suppressed by the trapping effect resulting from the groove portions 31*a* and 31*b*.

What is claimed is:

1. A spot-size converter comprising:
   a substrate;
   a clad that is formed on the substrate;
   a core that is embedded inside the clad, a full length of the core being embedded inside the clad; and
   an input/output end face;
   wherein the full length of the core is tapered toward the input/output end face along a light propagation direction, and
   the clad comprises groove portions that expose a substrate face and are formed so as to extend as far as the input/output end face and on both sides of the core along the light propagation direction.

2. The spot-size converter according to claim 1, further comprising transverse grooves that are formed in a peripheral clad portion including the core and are along the substrate face from the groove portions toward the core.

3. The spot-size converter according to claim 1, further comprising a reflective film that covers an exposed surface of the peripheral clad portion.

4. The spot-size converter according to claim 1, wherein the groove portions extend in a direction that is substantially perpendicular to a cross-sectional direction of the core, the groove portions having a constant width.

5. The spot-size converter according to claim 1, wherein a refractive index of the core is higher than a refractive index of the clad.

6. The spot-size converter according to claim 5, wherein the refractive index of the core is about 3.5 and the refractive index of the clad is between about 1.5 and about 1.7.

* * * * *